US006930588B2

(12) United States Patent
Sueoka et al.

(10) Patent No.: US 6,930,588 B2
(45) Date of Patent: Aug. 16, 2005

(54) KEY OPENING APPARATUS

(75) Inventors: Kazuhiko Sueoka, Gifu (JP); Tsutomu Sakai, Gifu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 232 days.

(21) Appl. No.: 10/328,570

(22) Filed: Dec. 23, 2002

(65) Prior Publication Data

US 2003/0132832 A1 Jul. 17, 2003

(30) Foreign Application Priority Data

Dec. 25, 2001 (JP) ....................................... 2001-391445

(51) Int. Cl.[7] .......................... H04Q 9/00; G05B 19/00; B60R 25/00

(52) U.S. Cl. ...................... 340/5.6; 340/5.61; 340/5.62; 340/5.63; 340/5.64; 340/5.7; 340/5.72

(58) Field of Search ................................ 340/5.6, 5.61, 340/5.62, 5.63, 5.64, 5.7, 5.72

(56) References Cited

U.S. PATENT DOCUMENTS 5,552,641 A 9/1996 Fischer et al.
5,635,913 A * 6/1997 Willmott et al. ....... 340/825.22
5,722,058 A 2/1998 Umemoto et al.

FOREIGN PATENT DOCUMENTS

| | | |
|---|---|---|
| EP | 1 162 754 | 12/2001 |
| WO | WO 99/34625 | 7/1999 |

OTHER PUBLICATIONS

European Search Report corresponding to application No. EP 02 02 8792 dated Mar. 9, 2005.

* cited by examiner

*Primary Examiner*—Michael Horabik
*Assistant Examiner*—Scott Au
(74) *Attorney, Agent, or Firm*—RatnerPrestia

(57) ABSTRACT

A key opening apparatus includes an antenna which receives a first signal of slower transmission speed and a second signal of higher transmission speed, a receiving section, a filter, a comparator, and a decoder, and another set of filter, comparator and decoder. The receiving section receives and processes the first and second signals in common, and the two decoders process the signals using one microprocessor before outputting the result to an output terminal.

5 Claims, 4 Drawing Sheets

KEY OPENING APPARATUS

FIELD OF THE INVENTION

The present invention relates to a key opening apparatus which performs controlling such as opening a door of a car or starting an engine of the car using radio waves of very high frequency (VHF) band.

BACKGROUND OF THE INVENTION

A conventional key opening apparatus is described hereinafter with reference to FIG. 5. In FIG. 5, operator 3 is away from car 1 having door 2. In this case, it may take some time from depressing a button on key 4 before opening door 2.

On the other hand, operator 5 near to car 1 desires door 2 to open by just touching knob 7 of door 2, and key 8 satisfying this request was already developed. A use of this key 8 saves operator 5 from taking the trouble to put down large baggage on the ground before depressing a button on key 8, and allows the operator 5 to release the key of the door by just touching knob 7. In this case, the radio wave 9 may travel within a short range; however, the radio wave preferably travels fast. On the contrary, operator 3 away from car 1 wants radio wave 10 to travel in a longer range, but it may travel at a slower speed.

A key opening apparatus, which communicates with key 4 delivering a radio wave of slower transmission speed, comprises the following elements as shown in FIG. 6: (This key-opening apparatus 11 is mounted in car 1.)

(a) antenna 15 for receiving radio wave 10 including a signal of a slower transmission speed (1 kbps);

(b) receiving section 16 for receiving the signal received by antenna 15;

(c) filter 17 for passing the signal of 1 kbps supplied from receiving section 16;

(d) comparator 18 for receiving an output from filter 17;

(e) decoder 19 for decoding an output from comparator 18; and (f) output terminal 20 for receiving an output from decoder 19.

In this key-opening apparatus structured above, radio wave 10 is supplied to antenna 15, and converted its frequency by receiving section 16, then filter 17 passes only a signal having a transmission speed of 1 kbps. This signal is shaped its waveform by comparator 18 before entering into decoder 19, which decodes the signal. When decoder 18 tells that door 2 may be opened, output terminal 20 outputs a key-opening signal to release the key of door 2.

Another key-opening apparatus that communicates with key 8 delivering a radio wave of higher transmission speed comprises the following elements as shown in FIG. 7: (This key-opening apparatus 21 is also mounted in car 1.)

(a) antenna 22 for receiving radio wave 9 including a signal of a higher transmission speed (15 kbps);

(b) receiving section 23 for receiving the signal received by antenna 22;

(c) filter 24 for passing the signal of 15 kbps supplied from receiving section 23;

(d) comparator 25 for receiving an output from filter 24;

(e) decoder 26 for decoding an output from comparator 25; and (f) output terminal 27 for receiving an output from decoder 26.

In this key-opening apparatus structured above, radio wave 9 is supplied to antenna 22, and converted its frequency by receiving section 23, then filter 24 passes only a signal having a transmission speed of 15 kbps. This signal is shaped its waveform by comparator 25 before entering into decoder 26, which decodes the signal. When decoder 26 tells that door 2 may be opened, output terminal 27 outputs a key-opening signal to release the key of door 2.

Conventional key-opening apparatuses 11, 21 discussed above are used in pairs, which require a large space and consume a great power.

SUMMARY OF THE INVENTION

A key-opening apparatus comprising the following elements is provided:

an antenna for receiving a first signal having a slower transmission speed and a second signal having a higher transmission speed, both the signals being modulated with a high frequency signal;

a receiving section for receiving the signals received by the antenna;

a first filter for passing the first signal supplied from the receiving section;

a first comparator to which an output from the first filter is supplied;

a first decoder for decoding an output from the first comparator;

a second filter for passing the second signal supplied from the receiving section;

a second comparator to which an output from the second filter is supplied; and a second decoder for decoding an output from the second comparator, where the receiving section receives and processes both of the first and second signals, and the first and second decoders share one microprocessor for decoding before it outputs the results to an output terminal.

DESCRIPTION OF THE PREFERRED EMBODIMENTS

Exemplary embodiments of the present invention are demonstrated hereinafter with reference to the accompanying drawings.

Exemplary Embodiment 1

Figure 1:
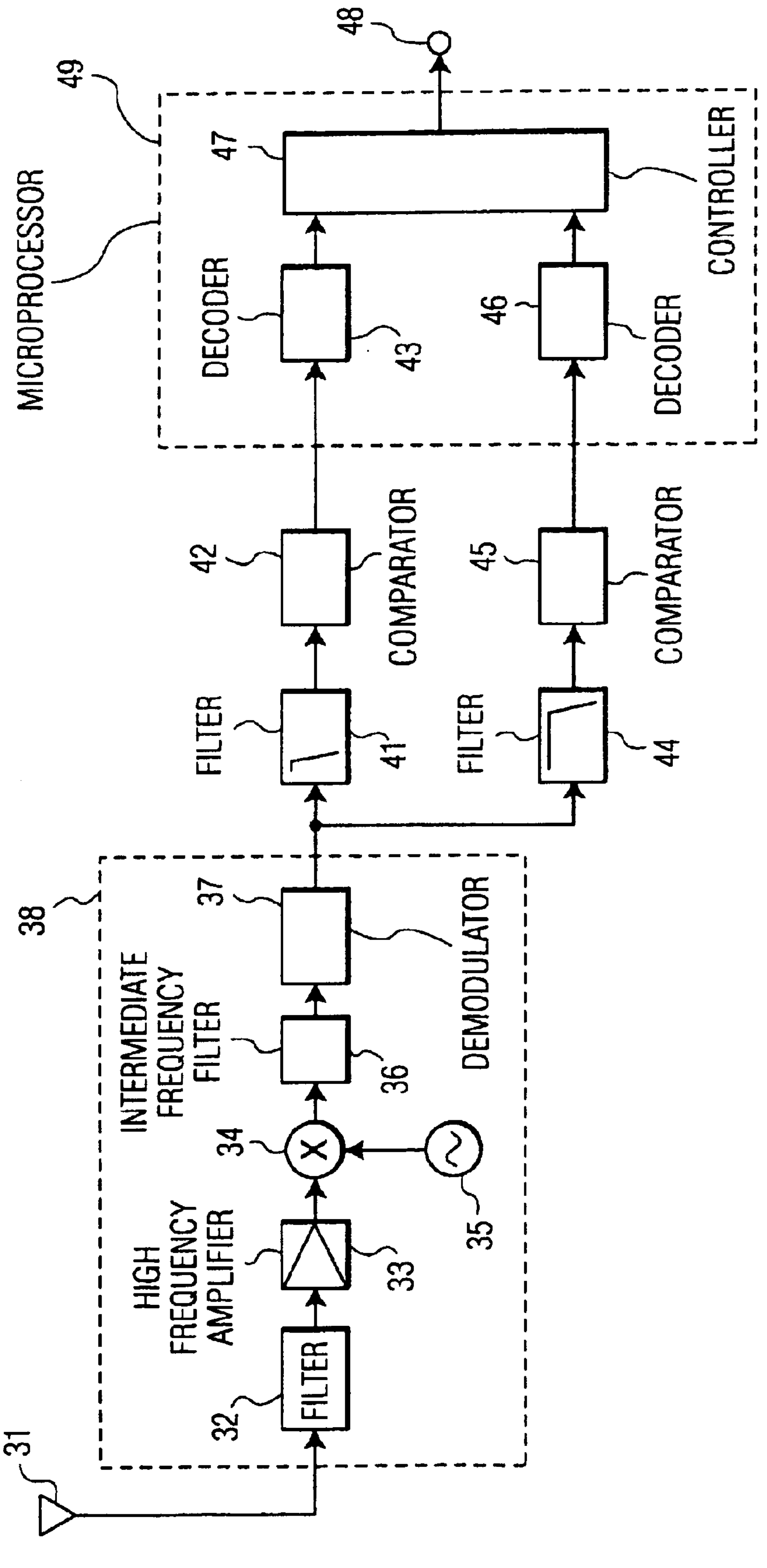
FIG. 1 is a block diagram showing a key-opening apparatus in accordance with a first exemplary embodiment of the present invention.

FIG. 1 is a block diagram showing a key-opening apparatus in accordance with the first exemplary embodiment. In FIG. 1, a tuning antenna is used as antenna 31 in this first embodiment for obtaining a better receiving sensitivity. A radio wave carrying a signal of a slower transmission speed (1 kbps) and another radio wave carrying a signal of a higher transmission speed (15 kbps). Both of the radio waves have carrier wave of 315 MHz.

Filter 32 is coupled to antenna 31, where a surface acoustic wave (SAW) filter, of which center frequency is 315 MHz, is used. A use of a SAW filter makes attenuating characteristics steep, removes noises out of the band efficiently, and passes the carrier wave of 315 MHz only. An output from filter 32 is supplied to a first terminal of mixer 34 via high-frequency amplifier 33. An output from local oscillator 35 is supplied to a second terminal of mixer 34, which mixes the output from local oscillator 35 with the output from filter 32 and produces an intermediate frequency of 10.7 MHz.

An output from mixer 34 passes through intermediate frequency filter 36, of which center frequency is 10.7 MHz and bandwidth is 280 kHz, then is demodulated by demodulator 37. Receiving section 38 comprises filter 32, high frequency amplifier 33, mixer 34, local oscillator 35, intermediate frequency filter 36 and demodulator 37.

An output from receiving section 38 (i.e., an output from demodulator 37) is supplied to filter 41. In the first embodiment, a low-pass filter of which cut-off frequency is 1 kHz is used as filter 41, so that less transmission loss of the pass band than that of a band-pass filter is achieved and a lower cost can be expected. A band-pass filter of 0.3–1 kHz can be used instead of filter 41.

An output from filter 41 is supplied to comparator 42, where an input signal is shaped its wave into a digital wave so that "0" and "1" are distinctly recognized. An output from comparator 42 is supplied to decoder 43 which is formed of software and decodes an input signal of slower transmission speed. An output from receiving section 38 is also supplied to filter 44. In the first embodiment, a low-pass filter of which cut-off frequency is 15 kHz is used as filter 44, so that less transmission loss of the pass band than that of a band-pass filter is achieved and a lower cost can be expected. A band-pass filter of 5–15 kHz can be used instead of filter 44. A use of the band-pass filter allows only a signal of higher transmission speed to pass, and removes a signal of slower transmission speed supplied as noises of out of band. As a result, correct decoding can be expected.

An output from filter 44 is supplied to comparator 45, where an input signal is shaped its wave into a digital wave so that "0" and "1" are distinctly recognized. An output from comparator 45 is supplied to decoder 46, which is also formed of software and decodes an input signal of higher transmission speed.

Outputs from both of decoders 43 and 46 are supplied to controller 47, which outputs a signal to output terminal 48 for the apparatus to work responsive to the decoded results by decoders 43 and 46, e.g., release a key of a door (a front door, a rear door or a trunk lid), or start the engine. Decoders 43, 46 and controller 47 are disposed in one microprocessor and controlled by software.

Figure 2:
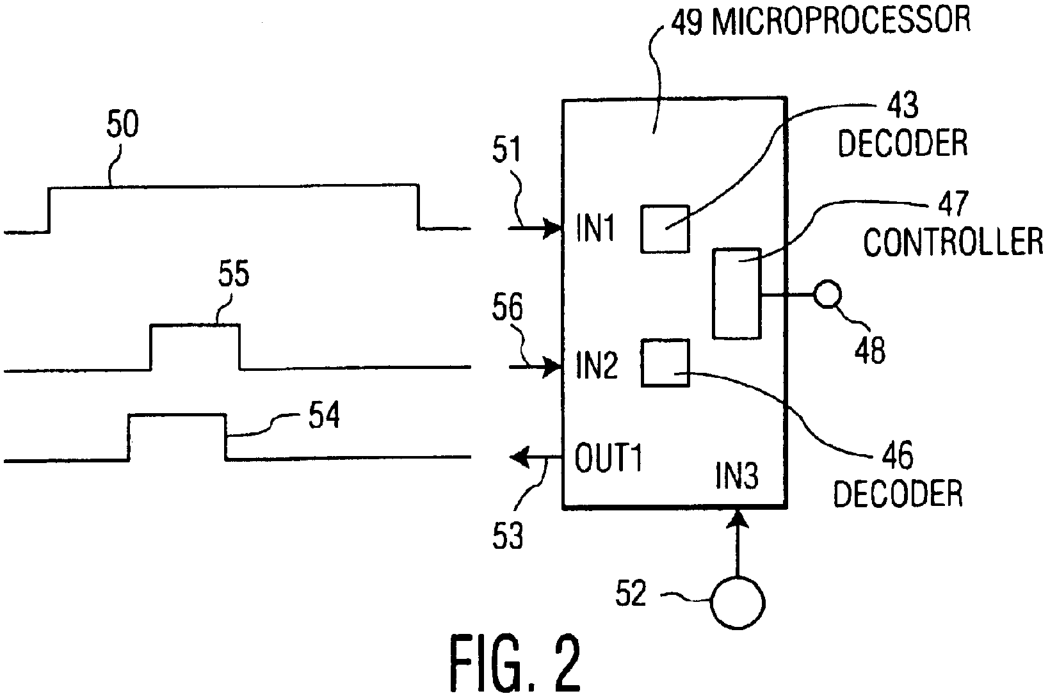
FIG. 2 is a schematic diagram illustrating input and output signals of a microprocessor forming an essential part in the first exemplary embodiment.

FIG. 2 illustrates input and output signals to and from microprocessor 49. In FIG. 2, signal 50 of a slower transmission speed (1 kbps) is supplied to terminal 51 of microprocessor 49. Signal 50 is, for instance, a decoded radio wave transmitted from key 4.

Figure 5:
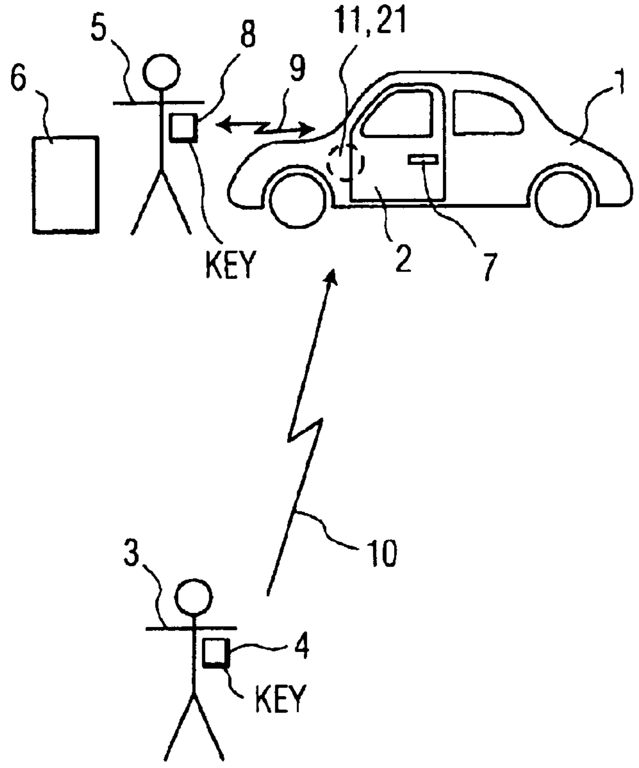
FIG. 5 PRIOR ART
FIG. 5 is a schematic diagram illustrating a system using a conventional key-opening apparatus.
Figure 6:
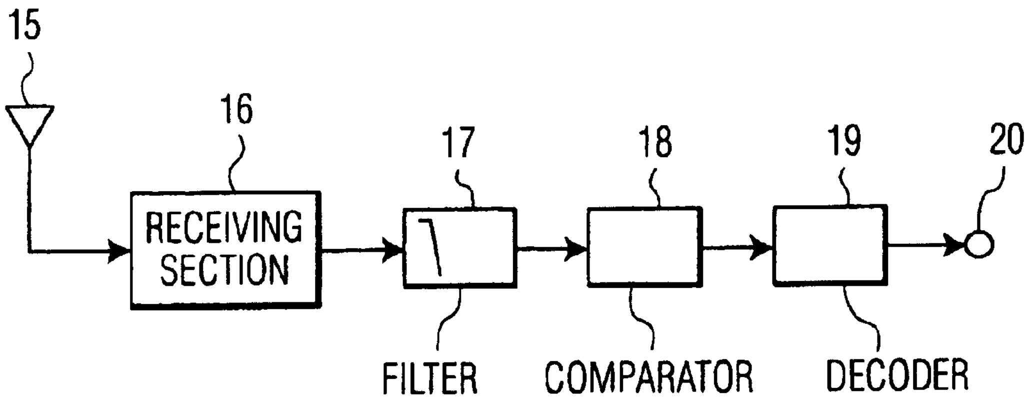
FIG. 6 PRIOR ART
FIG. 6 is a block diagram of a first example of a conventional key-opening apparatus.
Figure 7:
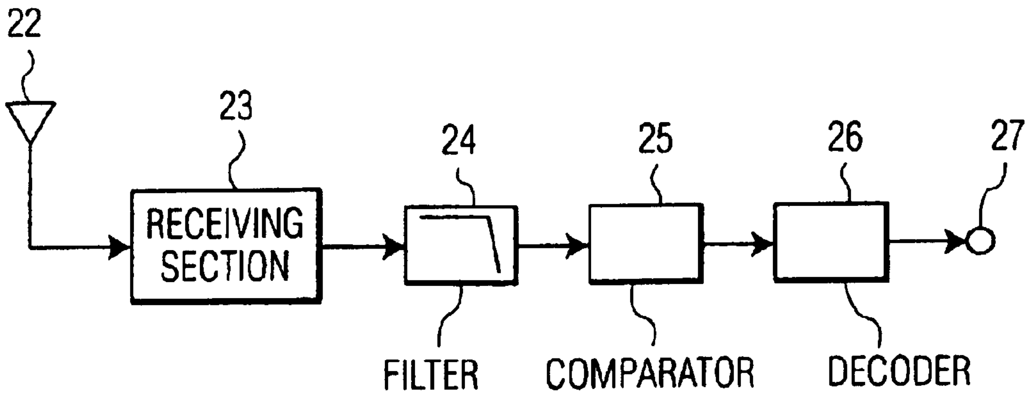
FIG. 7 PRIOR ART
FIG. 7 is a block diagram of a second example of a conventional key-opening apparatus.

Terminal 52 is, for instance, coupled to knob 7 of car 1 shown in FIG. 5, and when operator 5 touches knob 7, the touch is sensed and taken into microprocessor 49 via terminal 52. Signal 54 indicating the touch is output from terminal 53 to key 8 shown in FIG. 5. Key 8 transmits signal 55 carrying, e.g., an ID number to car 1. Signal 55 is supplied to terminal 56. Both of signals 54 and 55 have a higher transmission speed (15 kbps) and communicate with key 8 shown in FIG. 5.

Signals 50, 55 supplied to terminals 51, 56 are decoded by decoders 43, 46, which then supply the results to output terminal 48 via controller 47.

Figure 3:
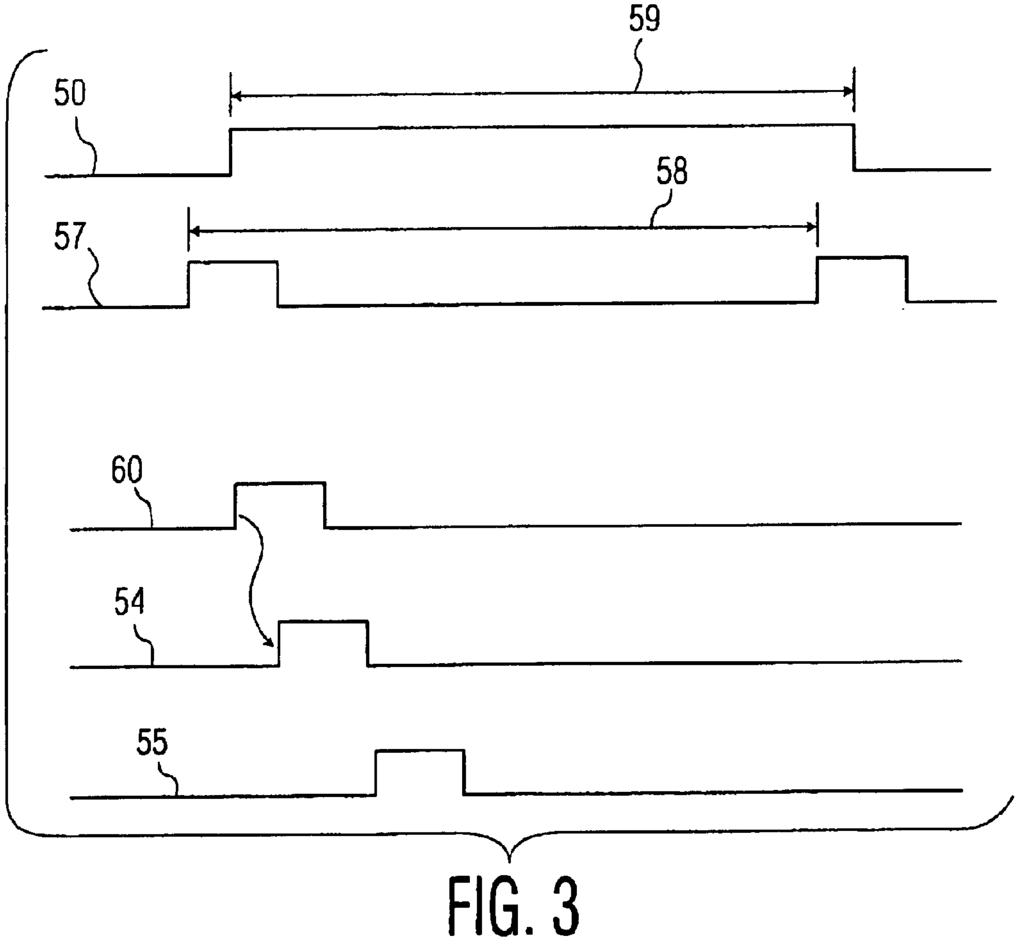
FIG. 3 is a timing chart of signals in accordance with the first exemplary embodiment.
Figure 4:
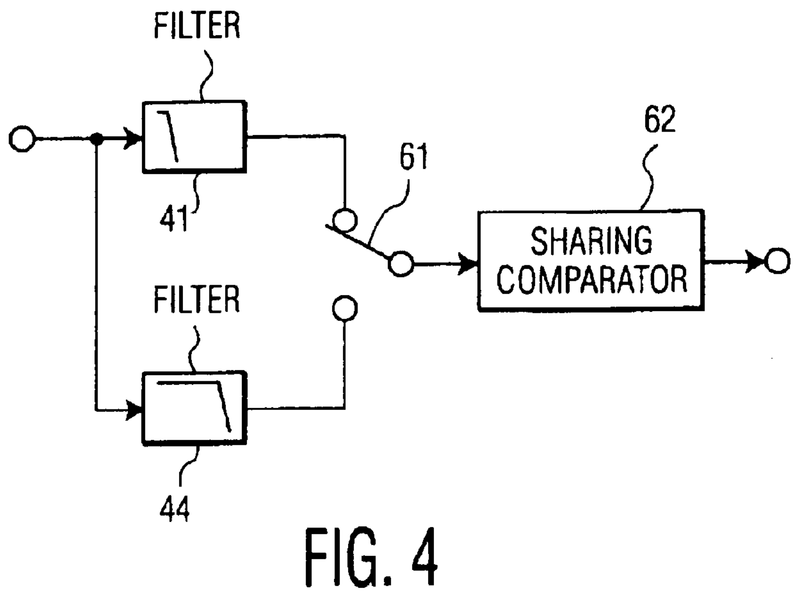
FIG. 4 is a block diagram illustrating an essential part of a key-opening apparatus in accordance with a second exemplary embodiment of the present invention.

FIG. 3 is a timing chart of signals. In FIG. 3, signal 50 is transmitted from key 4 shown in FIG. 5 and received by receiving section 38, then supplied to terminal 51. Timing 57 checks signal 50 in microprocessor 49. What is important here is to set cycle 58 of timing 57 shorter than a length 59 (duration time) of signal 50. This setting allows signal 50 to be positively taken in without missing. In the first embodiment, cycle 58 is set at 100 msec and length 59 of signal 50 is set at 150 msec.

Terminal 51 is thus checked at each cycle 58 set by a timer. When signal 50 is supplied terminal 51, the signal is taken-in and sent to decoder 43, which checks, first of all, the signal whether or not it has an authorized ID number. If the signal does not have the unauthorized ID number, decoder 43 neglects the signal. When the signal has the authorized ID number, decoder 43 then detects which item is to be processed, e.g., which door-key should be released or the engine is to be started. Decoder 43 then outputs the detection result to controller 47, which outputs a key-opening signal or an engine-starting signal to output terminal 48 based on the decoded result. Plural terminals 48 can be prepared responsive to the number of items to be processed.

Signal 60 is supplied to terminal 52 and converted by microprocessor 49 into signal 54 and tapped off from terminal 53 to key 8 shown in FIG. 5. When key 8 receives this signal, a signal containing an ID number and having a higher transmission speed is sent back from key 8 as signal 55 and supplied to terminal 56 of microprocessor 49.

A supply of signal 55 to terminal 56 prohibits the timer from interrupting, and decoder 46 decodes signal 55. In other words, signal 55 of higher transmission speed is processed in advance of signal 50 of slower transmission speed.

A process in decoder 46 is similar to that in decoder 43, i.e., decoder 46 firstly checks whether or not a signal contains an authorized ID number, and neglect a signal having an unauthorized ID number. When the signal has the authorized ID number, decoder 46 then detects which item is to be processed, e.g., which door-key should be released or the engine is to be started. Decoder 46 then outputs the detection result to controller 47, which outputs a key-opening signal or an engine-starting signal to output terminal 48 based on the decoded result, and permits the timer an interruption.

Exemplary Embodiment 2

The second embodiment shows that outputs from filters 41 and 42 are switched by electronic switch 61 before entering to comparator 62 shared by both the filters. Sharing comparator 62 allows downsizing of the apparatus, less power consumption and a lower cost.

In the first embodiment, releasing a key of a car or starting the engine of the car is described; however, the present invention is not limited to a car, but it can applicable to releasing a front-door key or a room key of a house.

As discussed above, according to the present invention, a key-opening apparatus comprises (a) a receiving section that receives and processes a first and a second signals in common, and (b) a first decoder and a second decoder that process signals using one microprocessor before outputting decoded result to an output terminal. Since the receiving section and the decoders can be shared by the first and second signals, the apparatus can be downsized and less power consumption can be expected. What is more, the number of components can be reduced, so that cost of the components can be lowered and the number of manufacturing steps can be reduced. As a result, a lower cost can be expected.

What is claimed is:

1. A key opening apparatus comprising:

an antenna for receiving a first signal of slower transmission speed and a second signal of higher transmission speed, both the signals are modulated with a high frequency signal;

a receiving section for receiving the signals received by the antenna;

a first filter that passes the first signal supplied from the receiving section;

a first comparator to which an output from the first filter is supplied;

a first decoder for decoding an output from the first comparator;

a second filter that passes the second signal supplied from the receiving section;

a second comparator to which an output from the second filter is supplied; and a second decoder for decoding an output from the second comparator, wherein the receiving section receives and processes the first and the second signals in common, and the first and the second decoders process the signals using a microprocessor and outputs a result to an output terminal.

2. The key opening apparatus of claim 1, wherein the first and the second filters are low pass filters.

3. The key opening apparatus of claim 1, wherein at least the second filter is a band pass filter.

4. A key opening apparatus comprising:

an antenna for receiving a first signal of slower transmission speed and a second signal of higher transmission speed, both the signals are modulated with a high frequency signal;

a receiving section for receiving the signals received by the antenna;

a first filter that passes the first signal supplied from the receiving section;

a comparator;

a decoder for decoding an output from the comparator;

a second filter that passes the second signal supplied from the receiving section; and an electronic switch that selectively switches the first filter to the second filter and vice versa for sharing the comparator;

wherein the receiving section receives and processes the first and the second signals in common, and the decoder processes the signals using a microprocessor and outputs a result to an output terminal.

5. The key opening apparatus of claim 1, wherein when the apparatus receives the first signal and the second signal simultaneously, the second signal is decoded in advance of the first signal.

* * * * *